(12) United States Patent
Murao et al.

(10) Patent No.: US 9,588,351 B2
(45) Date of Patent: Mar. 7, 2017

(54) STEREOSCOPIC DISPLAY DEVICE

(71) Applicant: Sharp Kabushiki Kaisha, Osaka-shi, Osaka (JP)

(72) Inventors: Takehiro Murao, Osaka (JP); Takuto Yoshino, Osaka (JP); Hiroshi Fukushima, Osaka (JP); Tomoo Takatani, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 44 days.

(21) Appl. No.: 14/361,014

(22) PCT Filed: Nov. 26, 2012

(86) PCT No.: PCT/JP2012/080508
§ 371 (c)(1),
(2) Date: May 28, 2014

(87) PCT Pub. No.: WO2013/080927
PCT Pub. Date: Jun. 6, 2013

(65) Prior Publication Data
US 2014/0347582 A1 Nov. 27, 2014

(30) Foreign Application Priority Data

Nov. 30, 2011 (JP) ................................ 2011-262937

(51) Int. Cl.
*G02B 27/22* (2006.01)
*G02F 1/1347* (2006.01)
(Continued)

(52) U.S. Cl.
CPC ....... *G02B 27/2214* (2013.01); *G02F 1/1347* (2013.01); *G02F 1/1323* (2013.01);
(Continued)

(58) Field of Classification Search
CPC .......... G02B 27/2214; G02F 1/134309; G02F 1/1323
See application file for complete search history.

(56) References Cited

U.S. PATENT DOCUMENTS

2006/0050385 A1* 3/2006 Uehara .............. G02B 27/2214
359/465
2006/0114561 A1 6/2006 Mashitani et al.
(Continued)

FOREIGN PATENT DOCUMENTS

EP 2 455 796 A1 5/2012
JP 2004-157411 A 6/2004
(Continued)

OTHER PUBLICATIONS

Official Communication issued in International Patent Application No. PCT/JP2012/080508, mailed on Dec. 25, 2012.

*Primary Examiner* — Kendrick Hsu
(74) *Attorney, Agent, or Firm* — Keating & Bennett, LLP (57) ABSTRACT

An objective is to provide a stereoscopic display device that can reduce moire occurring when the viewer is not at the optimum viewing position while maintaining the vertical degree of freedom. A parallax barrier (42) includes transparent portions (48) and light-shielding portions (46) arranged alternatingly. Supposing that a first direction is a direction in which the light-shielding portions (46) and the transparent portions (48) are arranged alternatingly and a second direction is a longitudinal direction of the light-shielding portions (46), a boundary portion (52) is present between two adjacent pixels (50) arranged in the first direction and extends in the second direction, and the edges (381, 382) of the light-shielding portions (46) disposed in the first direction have portions crossing a reference line (L)
(Continued)

extending in the second direction and fluctuate in a specified cycle along the second direction.

7 Claims, 7 Drawing Sheets

(51) Int. Cl.
    *G02F 1/1335*     (2006.01)
    *G02F 1/1343*     (2006.01)
    *G02F 1/13*     (2006.01)

(52) U.S. Cl.
    CPC .. *G02F 1/133524* (2013.01); *G02F 1/134309* (2013.01); *G02F 2201/123* (2013.01); *G02F 2203/62* (2013.01)

(56) References Cited

U.S. PATENT DOCUMENTS

| | | | |
|---|---|---|---|
| 2010/0053500 A1 | 3/2010 | Sugita et al. | |
| 2010/0182291 A1 | 7/2010 | Kim et al. | |
| 2011/0043715 A1* | 2/2011 | Ohyama | G02B 27/2214 349/15 |

FOREIGN PATENT DOCUMENTS

| | | |
|---|---|---|
| JP | 2010-060906 A | 3/2010 |
| JP | 2010-164966 A | 7/2010 |
| WO | 2011/007757 A1 | 1/2011 |

* cited by examiner

STEREOSCOPIC DISPLAY DEVICE

TECHNICAL FIELD

The present invention relates to a stereoscopic display device that reduces moire.

BACKGROUND ART

Parallax barrier systems that allow a viewer to see a stereoscopic image without the use of special glasses are known. A parallax barrier based stereoscopic display device includes, for example, a display panel and a switch liquid crystal panel. The display panel displays stereoscopic images. The switch liquid crystal panel can implement a parallax barrier. The parallax barrier includes apertures that pass light and light-shielding portions that block light. In the parallax barrier, apertures and light-shielding portions are arranged alternatingly.

In the case of a parallax barrier based stereoscopic display device with two viewpoints, the viewer must be located at the optimum viewing position to see stereoscopic images displayed on the display panel; if the viewer is not located at the optimum viewing position when viewing images, moire occurs on the screen, caused by light-shielding areas of the display panel (for example, the black matrix), preventing good display quality.

JP 2004-157411 A discloses a video display device that reduces moire. This video display device includes apertures for separating different videos displayed on the screen. The outlines of the apertures include transverse line portions that are non-parallel to the outlines of the pixels.

However, in the video display device of the above publication, the light-shielding portions (and apertures) are not continuous in a vertical direction of the screen. As such, when the viewer nods his head vertically (i.e. moves his gaze) while seeing stereoscopic video, crosstalk may easily occur, which means that the area where a viewer can experience good stereoscopy (hereinafter referred to as degree of freedom) is small.

DISCLOSURE OF THE INVENTION

An object of the present invention is to provide a stereoscopic display device that can reduce moire occurring when the viewer is not at the optimum viewing position while maintaining the vertical degree of freedom.

A stereoscopic display device according to the present invention includes: a display panel having a plurality of pixels for displaying stereoscopic images; and a parallax barrier located adjacent one of sides of the display panel disposed in a thickness direction and having transparent portions and light-shielding portions arranged alternatingly, wherein, a first direction being a direction in which the light-shielding portions and the transparent portions are arranged alternatingly and a second direction being a longitudinal direction of the light-shielding portions, a boundary portion is present between two adjacent pixels arranged in the first direction and extends in the second direction, and edges of the light-shielding portions disposed in the first direction have portions crossing a reference line extending in the second direction and fluctuate in a specified cycle along the second direction.

The stereoscopic display device of the present invention can reduce moire occurring when the viewer is not at the optimum viewing position while maintaining the vertical degree of freedom.

EMBODIMENTS FOR CARRYING OUT THE INVENTION

A stereoscopic display device according to an embodiment of the present invention includes: a display panel having a plurality of pixels for displaying stereoscopic images; and a parallax barrier located adjacent one of sides of the display panel disposed in a thickness direction and having transparent portions and light-shielding portions arranged alternatingly, wherein, a first direction being a direction in which the light-shielding portions and the transparent portions are arranged alternatingly and a second direction being a longitudinal direction of the light-shielding portions, a boundary portion is present between two adjacent pixels arranged in the first direction and extends in the second direction, and edges of the light-shielding portions disposed in the first direction have portions crossing a reference line extending in the second direction and fluctuate in a specified cycle along the second direction (first arrangement).

In the first arrangement, the edges of a boundary portion disposed in the first direction and the edges of a light-shielding portion disposed in the first direction are non-parallel. This will reduce moire occurring when the viewer is not at the optimum position for viewing stereoscopic images.

In a second arrangement, in connection with the first arrangement, each pixel includes a plurality of subpixels, the subpixels being arranged in the second direction, the specified cycle is not larger than a pitch of the subpixels as measured in the second direction. This arrangement will reduce moire occurring when the viewer is not at the optimum position for viewing stereoscopic images displayed on a display panel with low resolution where the pitch of the subpixels is 50 μm or larger, for example. In implementations where a display panel with low resolution where the pitch of the subpixels is 50 μm or larger includes light-shielding portions with edges disposed in the first direction fluctuating along the second direction in a cycle of twice the pitch of the subpixels, the arrangement will prevent, during stereoscopic display, black lines in a horizontal direction (i.e. first direction) from being produced at the positions with a viewpoint switch. Such black lines are produced in implementations where the relationship between the subpixels and the barrier shape varies on a subpixel-by-subpixel basis such that moire is produced at a different position in each subpixel. Such black lines are not visible if the pitch of the subpixels is relatively small (for example, 50 μm or smaller); if the pitch of the subpixels is relatively large, such black lines are visible, impairing display quality.

In a third arrangement, in connection with the first or second arrangement, the edges of the light-shielding portions disposed in the first direction include a straight line extending in a direction at an angle with the reference line. This arrangement will also reduce moire.

In a fourth arrangement, in connection with the first or second arrangement, the edges of the light-shielding portions disposed in the first direction are wavy lines extending in the second direction. This arrangement will also reduce moire.

In connection with one of the first to fourth arrangements, a fifth arrangement further includes a switch liquid crystal panel located adjacent one of the sides of the display panel disposed in the thickness direction, the switch liquid crystal panel including: a pair of substrates; a liquid crystal layer enclosed between the substrates; a common electrode provided on one of the substrates; and a plurality of drive electrodes provided on the other of the substrates and each working together with the common electrode when a voltage is applied to implement a light-shielding portion. This arrangement can show a 2D image to the viewer when the display panel is displaying a 2D image and the switch liquid crystal panel is not implementing a parallax barrier, thereby enabling switching between 2D display (planar image display) and 3D display (stereoscopic image display).

A stereoscopic display device according to another embodiment of the present invention includes: a display panel having a plurality of pixels for displaying a stereoscopic image; and a lenticular lens located adjacent one of sides of the display panel disposed in a thickness direction and having a plurality of cylindrical lenses arranged in a planar direction of the display panel, wherein, a first direction being a direction in which the cylindrical lenses are arranged and a second direction being a longitudinal direction of the cylindrical lenses, a boundary portion is present between two adjacent pixels arranged in the first direction and extends in the second direction, and edges of the cylindrical lenses disposed in the first direction have portions crossing a reference line extending in the second direction and fluctuate in a specified cycle along the second direction.

In this arrangement, the edges of a boundary portion disposed in the first direction and the edges of a light-shielding portion disposed in the first direction are not parallel. This will reduce moire occurring when the viewer is not at the optimum position for viewing stereoscopic images and, since the ridges of the cylindrical lenses are parallel to the reference line from a macroscopic viewpoint, similar to a parallax barrier, will not impair the degree of freedom in the second direction.

Now, more specific embodiments of the present invention will be described with reference to the drawings. The same or corresponding components in the drawings are labeled with the same characters and their description will not be repeated. For ease of understanding, the drawings to which reference will be made hereinafter show simplified or schematic representation, or do not show some components. The size ratios of the components shown in the drawings do not necessarily represent the actual size ratios.

Embodiments

Figure 1:
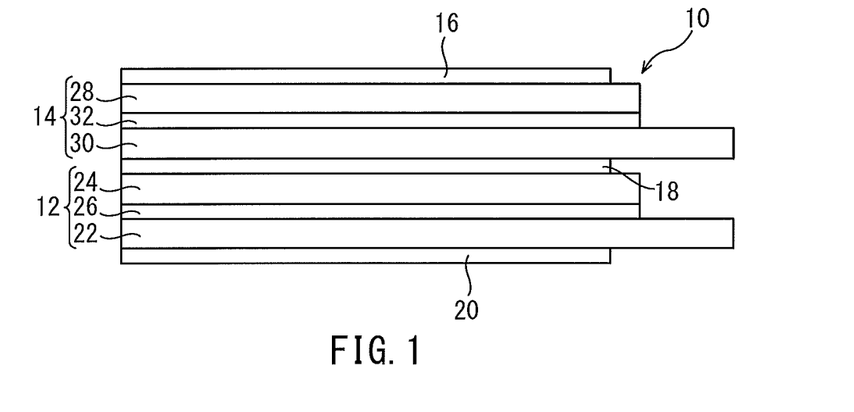
FIG. 1 is a schematic view of an example of a stereoscopic display device according to an embodiment of the present invention.
Figure 2:
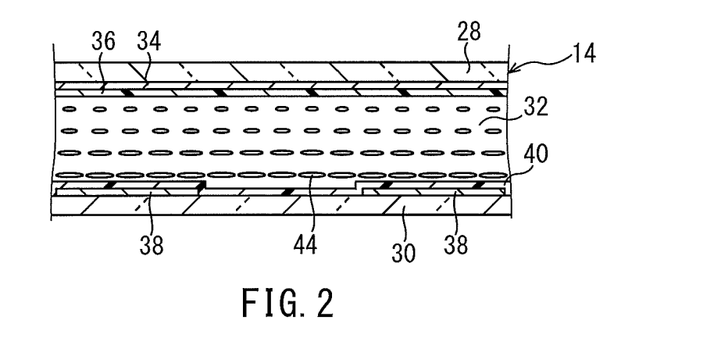
FIG. 2 is a schematic cross-sectional view of an example of a switch liquid crystal panel.

FIG. 1 shows a stereoscopic display device 10 according to an embodiment of the present invention. The stereoscopic display device 10 includes a display panel 12, a switch liquid crystal panel 14, and polarizers 16, 18 and 20.

The display panel 12 is a liquid crystal panel. The display panel 12 includes an active-matrix substrate 22, a counter substrate 24 and a liquid crystal layer 26 enclosed between these substrates 22 and 24. In the display panel 12, the liquid crystal may be operated in any mode.

Figure 3:
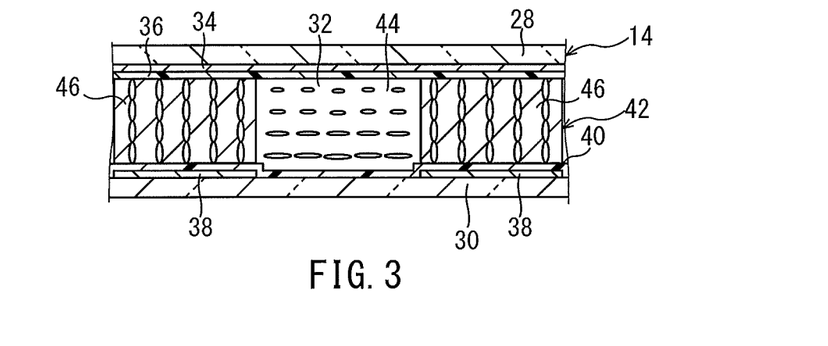
FIG. 3 is a schematic cross-sectional view of an example of a switch liquid crystal panel, as implementing a parallax barrier.

The switch liquid crystal panel 14 is located adjacent one of the sides of the display panel 12 disposed in the thickness direction. As shown in FIG. 3, the switch liquid crystal panel 14 includes a pair of substrates 28 and 30 and a liquid crystal layer 32.

One substrate 28 may be, for example, a low-alkali glass substrate. The one substrate 28 has a common electrode 34 formed thereon.

The common electrode 34 may be a transparent conductive film such as an indium-tin oxide (ITO) film. The common electrode 34 is formed generally over the entire face of the one substrate 28.

The common electrode 34 is covered with an oriented film 36. The oriented film 36 may be, for example, a polyimide resin film.

The other substrate 30 may be, for example, a low-alkali glass substrate. The other substrate 30 has a plurality of drive electrodes 38 formed thereon.

The drive electrodes 38 may be made from a transparent conductive film such as an indium-tin oxide (ITO) film. The drive electrodes 38 extend in a vertical direction of the other substrate 30 with a generally constant width.

The drive electrodes 38 are arranged in a horizontal direction of the other substrate 30. The drive electrodes 38 have an identical pitch. The pitch of the drive electrodes 38 is smaller than the pitch of the pixels 50 (see FIG. 4) as measured in a horizontal direction of the display panel 12.

The drive electrodes 38 are covered with an oriented film 40. The oriented film 40 may be, for example, a polyimide resin film.

The liquid crystal layer 32 is enclosed between the substrates 28 and 30. In the switch liquid crystal panel 14, the liquid crystal may be operated in normally white TN mode.

The polarizer 16 is located adjacent one of the sides of the switch liquid crystal panel 14 disposed in the thickness direction. The polarizer 18 is located between the switch liquid crystal panel 14 and display panel 12. The polarizer 20 is located adjacent the other one of the sides of the display panel 12 disposed in the thickness direction.

In the stereoscopic display device 10, the parallax barrier is implemented by the switch liquid crystal panel 14. A parallax barrier 42 will be described with reference to FIG. 3.

To implement the parallax barrier 42, the drive electrodes 38 are placed at a different potential from that for the common electrode 34. This causes the orientation of those liquid crystal molecules 44 that are located between the drive electrodes 38 and common electrode 34 to change. As such, the portions of the liquid crystal layer 32 that are located between the drive electrodes 38 and common electrode 34 serve as light-shielding portions 46, while the portions located between the light-shielding portions 46 serve as transparent portions 48. Thus, the liquid crystal layer 32 implements the parallax barrier 42 with light-shielding portions 46 and transparent portions 48 arranged alternatingly.

When the switch liquid crystal panel 14 is to implement the parallax barrier 42, voltages may be applied to the electrodes 34 and 38 where the voltage applied to the drive electrodes 38 and the voltage applied to the common electrode 34 are of opposite phase, for example, or a voltage is applied to the drive electrodes 38 while the common electrode 34 is grounded, or the drive electrodes 38 are grounded while a voltage is applied to the common electrode 34. A voltage applied may be, for example, a 5 V rectangular wave.

Figure 4:
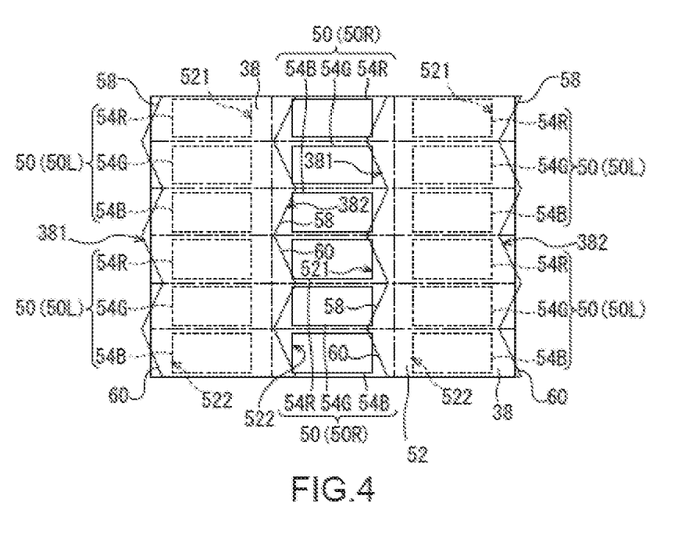
FIG. 4 is a plan view of the device illustrating the relationship between the edges of drive electrodes and the edges of boundary portions.

The direction in which the drive electrodes 38 are arranged will be referred to as first direction, and the longitudinal direction of the drive electrodes 38 will be referred to as second direction. As shown in FIG. 4, the edges of the drive electrodes 38 disposed in the first direction, 381 and 382, and the edges of the boundary portions 52 of the pixels 50 on the display panel 12 disposed in the first direction, 521 and 522, are non-parallel.

As shown in FIG. 4, the display panel 12 includes a plurality of pixels 50. The pixels 50 may be arranged in a matrix, for example.

In the display panel 12, columns of pixels 50 (50R) for displaying an image to be seen by the right eye of the viewer (right eye image) and columns of pixels 50 (50L) for displaying an image to be seen by the left eye of the viewer (left eye image) are arranged alternatingly in a horizontal direction of the display panel 12. In other words, each of the right and left eye images is divided (into stripes) on a pixel column basis. Then, a composite image having these stripes of right and left eye images arranged alternatingly is displayed on the display panel 12. If, at this moment, the parallax barrier 42 is implemented by the switch liquid crystal panel 14, only a right eye image reaches the right eye of the viewer, and only a left eye image reaches the left eye of the viewer. Thus, the viewer can see a stereoscopic image without the use of special glasses. If the display panel 12 displays a planar image when the parallax barrier 42 is not implemented by the switch liquid crystal panel 14, the viewer can see a planar image.

As shown in FIG. 4, each pixel 50 includes three subpixels 54R, 54G and 54B. The three subpixels 54R, 54G and 54B are arranged in the second direction (i.e. a vertical direction of the display panel 12).

A boundary portion 52 is present between two adjacent pixels 50 arranged in the first direction (i.e. a horizontal direction of the display panel 12). The boundary 52 may be part of a black matrix, for example.

The boundary portion 52 extends in the second direction with a generally constant width. The edges 521 and 522 of the boundary portion 52 disposed in the first direction are straight lines extending in the second direction.

A boundary portion 56 is present between two adjacent subpixels arranged in the second direction. The boundary portion 56 may be part of a black matrix, for example. The boundary portion 56 is formed continuously with the boundary portion 52.

As shown in FIG. 4, the drive electrodes 38 extend in the second direction. The edges 381 and 382 of the drive electrodes 38 include first inclined sides 58 and second inclined sides 60.

Figure 5:
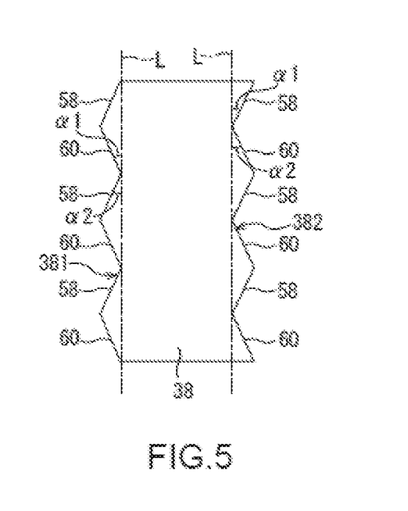
FIG. 5 is a plan view of a drive electrode.

As shown in FIG. 5, a first inclined side 58 is a straight line at an angle with respect to a reference line L extending in the second direction. The inclination angle $\alpha 1$ of the first inclined side 58 with respect to the reference line L may be, for example, 5° to 20°. The size of the first inclined side 58 as measured in the second direction is equal to the pitch of the subpixels as measured in the second direction.

A second inclined side 60 is a straight line inclined in a different direction from that of the first inclined sides 58, with that of the reference line L therebetween. The second inclined side 60 is inclined toward an opposite direction from that of the first inclined side 58. The inclination angle $\alpha 2$ of the second inclined side 60 with respect to the reference line L may be, for example, 5° to 20°. In the implementation shown in FIGS. 4 and 5, the inclination angles $\alpha 1$ and $\alpha 2$ are equal. The size of the second inclination side 60 as measured in the second direction is equal to the pitch of the subpixels as measured in the second direction.

The first and second inclination sides 58 and 60 are arranged alternatingly along the second direction. Thus, the edges 381 and 382 of the drive electrodes 38 fluctuate in a specified cycle along the second direction. Although the edges 381 and 382 of the drive electrodes 38 fluctuate in a specified cycle along the second direction, the electrodes are parallel to the reference line L extending in the second direction from a macroscopic viewpoint.

In a drive electrode 38, a first inclined side 58 of one edge 381 and a first inclined side 58 of the other edge 382 are located at the same position as measured in the longitudinal direction of the drive electrode 38 (i.e. the second direction).

In a drive electrode 38, a second inclined side 60 of one edge 381 and a second inclined side 60 of the other edge 382 are located at the same position as measured in the second direction.

Thus, while the edges 381 and 382 of a drive electrode 38 fluctuate cyclically along the second direction, the width of the drive electrode 38 (i.e. its size as measured in the first direction) is generally constant along the second direction. In other words, the size of the area between two adjacent drive electrodes 38 (i.e. the area corresponding to the transparent portion 48) is generally constant along the second direction. This prevents brightness from changing along the second direction. Further, since the light-shielding portions 46 extend in the second direction with a generally constant width, the light-shielding properties of a conventional stripe-shaped parallax barrier are maintained.

In the stereoscopic display device 10, the edges 521 and 522 of the boundary portions 52 and the edges 381 and 382 of the drive electrodes 38 are not parallel. This reduces moire occurring when the viewer is not at the optimum viewing position.

Figure 6:
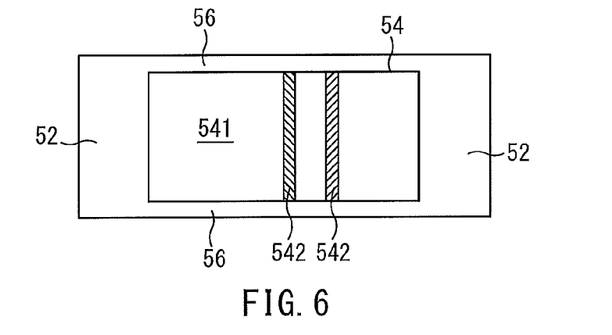
FIG. 6 is a plan view illustrating the presence of light-shielding areas in the aperture region of a subpixel.

For example, an implementation where light-shielding areas 542 are present in an aperture region 541 of a subpixel 54, as shown in FIG. 6, will be discussed. In this implementation, moire occurs due to the light-shielding areas 542. However, if the edges of the light-shielding areas 542 and the edges 381 and 382 of drive electrodes 38 are non-parallel, this will prevent moire caused by the light-shielding areas 542. The light-shielding areas 542 may be, for example, part of the electrodes of accumulating capacitors or ribs which define the thickness of the liquid crystal layer 26.

Figure 7:
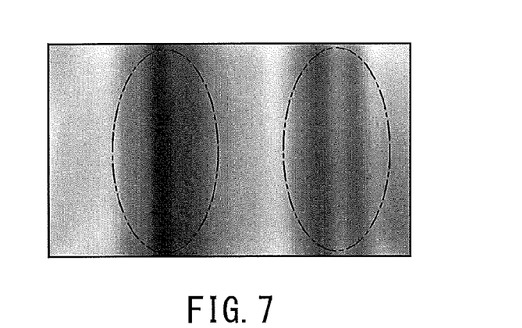
FIG. 7 is a plan view of the device showing moire occurring in a conventional implementation.
Figure 8:
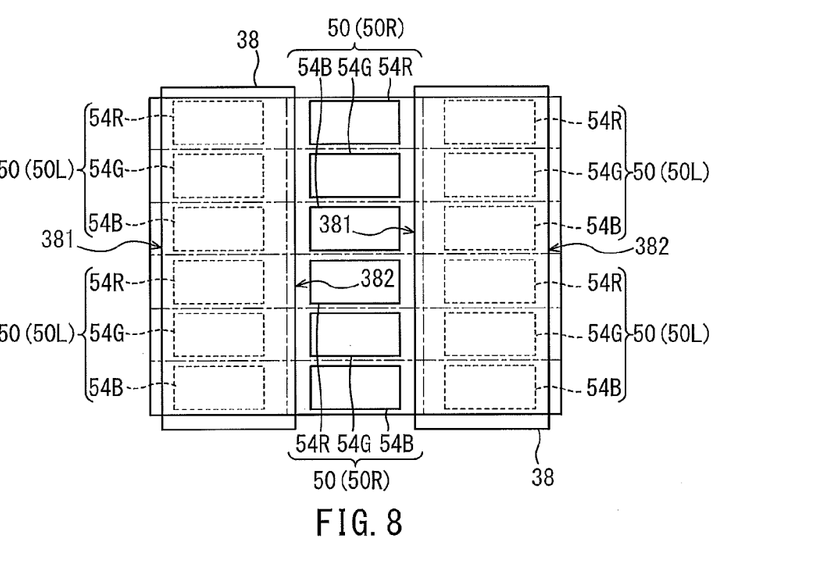
FIG. 8 is a plan view of the conventional device illustrating the positional relationship between drive electrodes and pixels.
Figure 9:
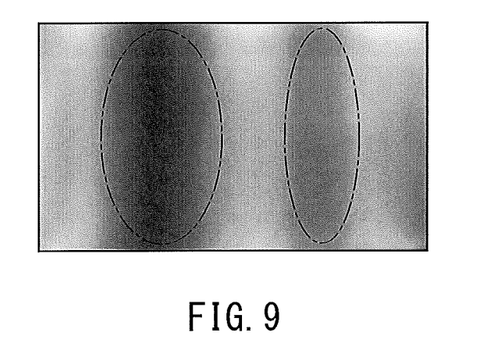
FIG. 9 is a plan view of the device showing moire occurring in an implementation according to the present embodiment.

FIG. 7 shows moire (enclosed by the one-dot chain lines) occurring in a conventional implementation. In this conventional implementation, as shown in FIG. 8, the edges 521 and 522 of boundary portions 52 disposed in the first direction and the edges 381 and 382 of drive electrodes 38 disposed in the first direction are parallel. FIG. 9 shows moire (enclosed by the one-dot chain lines) occurring in an implementation according to the present embodiment.

The pictures of moire shown in FIGS. 7 and 9 were taken in the following manner: first, a parallax barrier was implemented by the switch liquid crystal panel. Then, all the pixels of the display panel were caused to display white. The distribution of brightness at this time was imaged using a color luminance meter. In FIGS. 7 and 9, high brightness is indicated by white and low brightness is indicated by black. When the pictures of moire shown in FIGS. 7 and 9 were taken, light-shielding areas as shown in FIG. 6 were present in the aperture region of each subpixel on the display panel.

In FIG. 7, the shapes of the light-shielding areas present in the aperture regions of subpixels are directly reflected in the moire. Thus, there are a relatively large number of moire patterns. As such, moire is relatively visible when the viewer is not at the optimum viewing position to view the device. In contrast, in FIG. 9, the brightness profiles are made broader. That is, the shapes of the light-shielding areas present in the aperture regions of subpixels are not directly reflected in the moire. Thus, the moire becomes lighter. In other words, moire is less visible.

Application 1 of Embodiment

Figure 10:
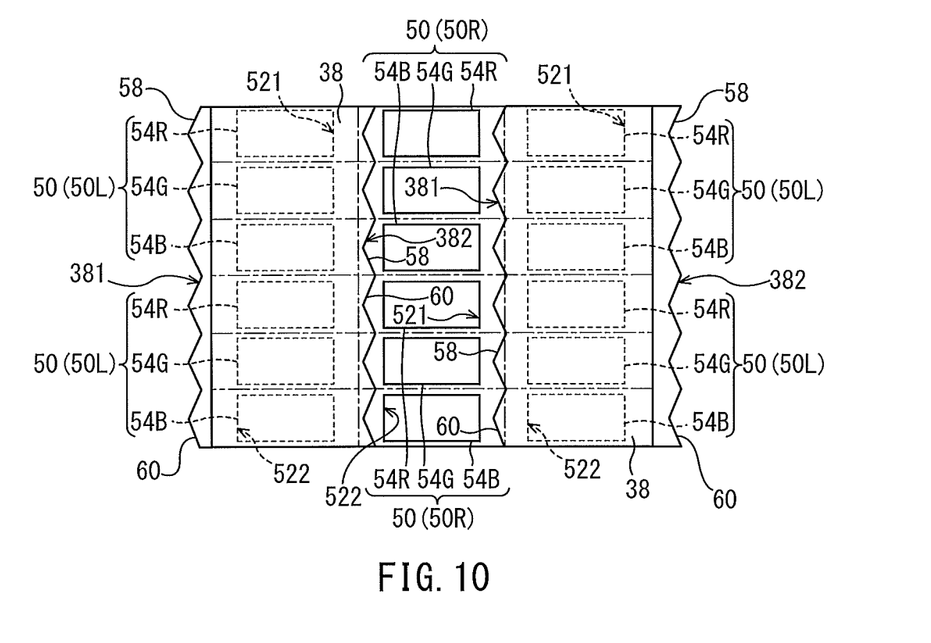
FIG. 10 is a plan view of a device according to Application 1 of the present embodiment, illustrating the relationship between the edges of drive electrodes and the edges of boundary portions.

The cycle in which the edges 381 and 382 of the drive electrodes 38 fluctuate is not limited to that of twice the pitch of the subpixels 54R, 54G and 54B, as in the above embodiment. For example, as shown in FIG. 10, the cycle in which the edges 381 and 382 of the drive electrodes 38 fluctuate may be equal to the pitch of the subpixels 54R, 54G and 54B. In this way, when a stereoscopic image is displayed on a display panel 12 with low resolution where the pitch of the subpixels 54R, 54G and 54B is 50 µm or larger, for example, black lines in a horizontal direction at the positions with a viewpoint switch are prevented from being visible.

Application 2 of Embodiment

Figure 11:
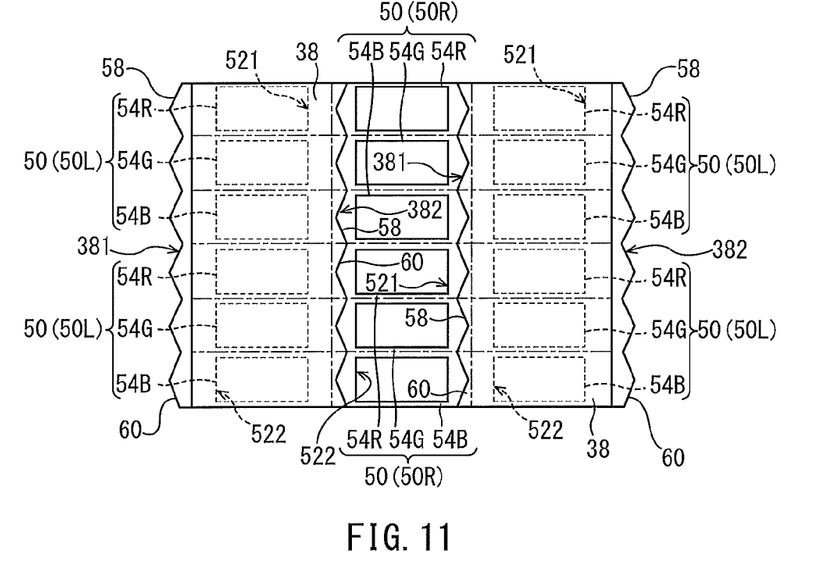
FIG. 11 is a plan view of a device according to Application 2 of the present embodiment, illustrating the relationship between the edges of drive electrodes and the edges of boundary portions.

For example, as shown in FIG. 11, a drive electrode 36 may be a mirror image of a next one (producing a line symmetrical pattern). In the implementation shown in FIG. 11, the cycle in which the edges 381 and 382 of the drive electrodes 38 fluctuate is equal to the pitch of the subpixels 54R, 54G and 54B.

Application 3 of Embodiment

Figure 12:
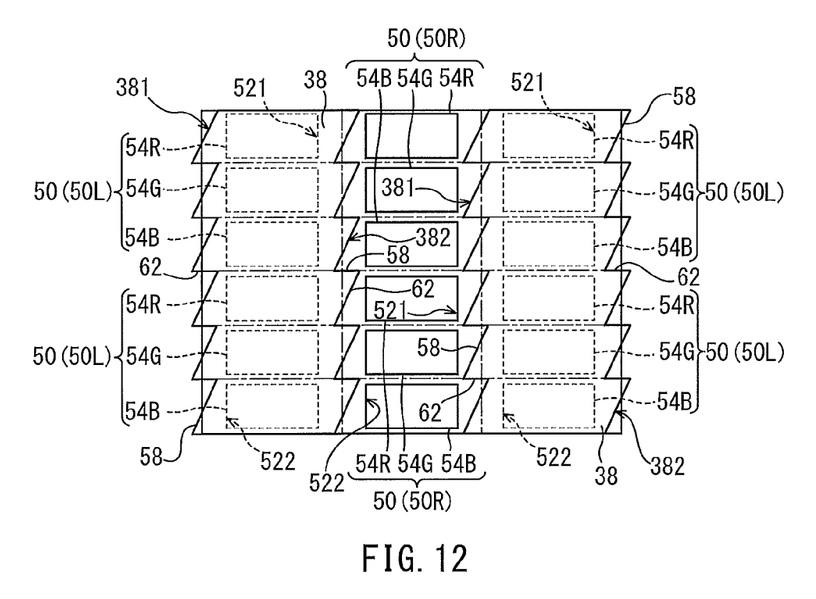
FIG. 12 is a plan view of a device according to Application 3 of the present embodiment, illustrating the relationship between the edges of drive electrodes and the edges of boundary portions.

For example, as shown in FIG. 12, the edges 381 and 382 of the drive electrodes 38 may include first inclined sides 58 and horizontal sides 62. The horizontal sides 62 extend in a direction in which the drive electrodes 38 are arranged. A horizontal side 62 connects ends of two first inclined sides 58.

Application 4 of Embodiment

Figure 13:
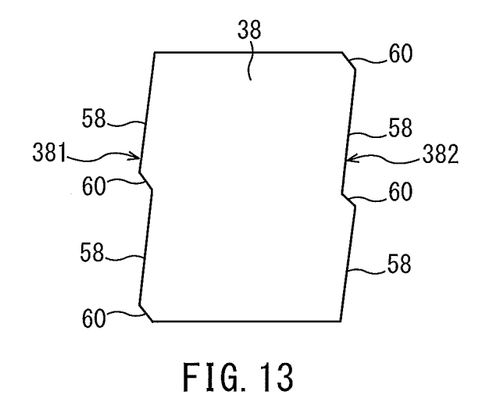
FIG. 13 is a plan view of a drive electrode according to Application 4 of the present embodiment, showing the shapes of its edges.

The size of a first inclined side 58 as measured in the second direction and the size of a second inclined side 60 as measured in the second direction need not be equal as in the above embodiment. For example, as shown in FIG. 13, the size of a first inclined side 58 as measured in the second direction may be different from the size of a second inclined side 60 as measured in the second direction.

Application 5 of Embodiment

Figure 14:
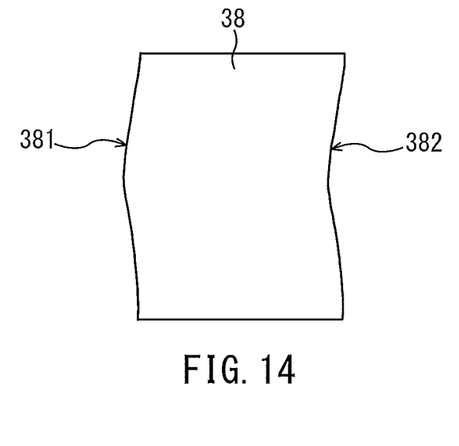
FIG. 14 is a plan view of a drive electrode according to Application 5 of the present embodiment, showing the shapes of its edges.

For example, as shown in FIG. 14, the edges 381 and 382 of a drive electrode 38 may be wavy lines extending in the second direction.

Application 6 of Embodiment

Figure 15:
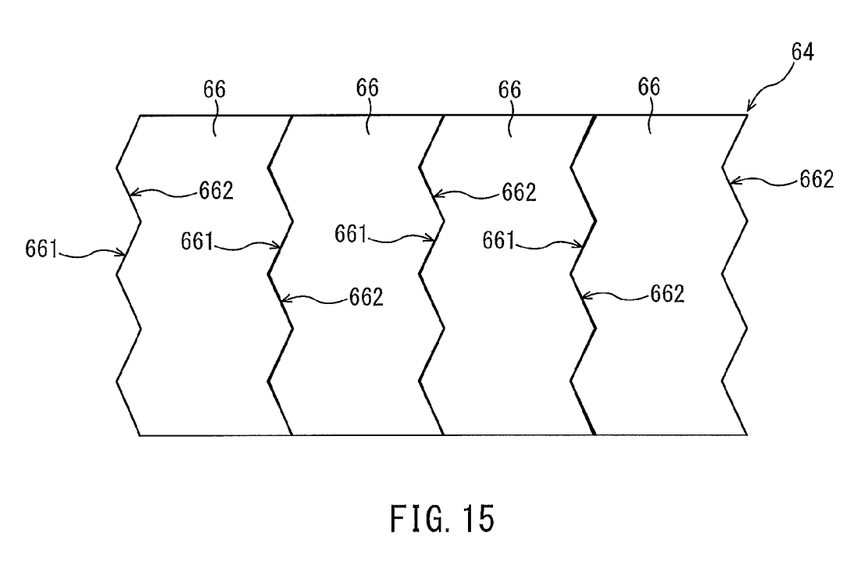
FIG. 15 is a plan view of a lenticular lens that may be employed in a stereoscopic display device according to an embodiment of the present invention.

As shown in FIG. 15, the stereoscopic display device may include a lenticular lens 64 in lieu of a switch liquid crystal panel. The lenticular lens 64 is located adjacent one of the sides of the display panel disposed in the thickness direction (i.e. closer to the viewer). The lenticular lens 64 includes a plurality of cylindrical lenses 66. The cylindrical lenses 66 are arranged in a horizontal row on the display panel. The edges 661 and 662 of the cylindrical lenses 66 are non-parallel to the edges of the boundary portions of the pixels. This lenticular lens will also prevent moire.

Application 7 of Embodiment

For example, the open width of a transparent portion 48 may be larger than the width of the aperture (as measured in a direction in which the drive electrodes 38 are arranged) of a pixel 50 (i.e. subpixels 54R, 54G and 54B) such that a lens-like structure is formed at the transparent portion 48. In this case, light collection occurs at the transparent portion 48. This will improve brightness during 3D display.

Application 8 of Embodiment

The stereoscopic display device may accommodate rotation, for example. In this case, the switch liquid crystal panel may implement a parallax barrier for landscape display or a parallax barrier for portrait display.

While embodiments of the present invention have been described in detail, they are merely examples and the present invention is not limited by any means to the embodiments illustrated above.

For example, in connection with the embodiments illustrated above, the display panel 12 may be a plasma display panel, an organic electroluminescence (EL) panel, or an inorganic EL panel.

A switch liquid crystal panel need not be provided. For example, a parallax barrier may be provided adjacent one of the sides of the display panel disposed in the thickness direction.

The invention claimed is:

1. A stereoscopic display device comprising:
a display panel including a plurality of pixels that display stereoscopic images; and
a parallax barrier located adjacent to one of sides of the display panel disposed in a thickness direction and including transparent portions and light-shielding portions arranged alternatingly, wherein
a first direction being a direction in which the light-shielding portions and the transparent portions are arranged alternatingly and a second direction being a longitudinal direction of the light-shielding portions,
the light-shielding portions are positioned in the parallax barrier such that only a left eye image is allowed to be viewed from one of two viewpoints along the first direction, and only a right eye image is allowed to be viewed from another of the two viewpoints,
a boundary portion is present between two adjacent pixels arranged in the first direction and extends in the second direction,
edges of the light-shielding portions disposed in the first direction include portions crossing a reference line extending in the second direction and fluctuate in a specified cycle along the second direction,
a fluctuation range of the edges of the light-shield portions in the first direction is not wider than a distance between the pixels in the first direction, and
the edges of the light-shielding portions do not reach an adjacent pixel.

2. The stereoscopic display device according to claim 1, wherein:
each pixel includes a plurality of subpixels,
the subpixels being arranged in the second direction,
the specified cycle is not larger than a pitch of the subpixels as measured in the second direction.

3. The stereoscopic display device according to claim 1, wherein:
the edges of the light-shielding portions disposed in the first direction include a straight line extending in a direction at an angle with the reference line.

4. The stereoscopic display device according to claim 1, wherein:
the edges of the light-shielding portions disposed in the first direction are wavy lines extending in the second direction.

5. The stereoscopic display device according to claim 1, wherein: the edges of the light-shielding portions disposed in the first direction are not parallel to edges of the boundary portion disposed in the first direction.

6. A stereoscopic display device comprising:
a display panel including a plurality of pixels that display stereoscopic images; and
a parallax barrier located adjacent to one of sides of the display panel disposed in a thickness direction and including transparent portions and light-shielding portions arranged alternatingly, wherein
the parallax barrier is produced by a switch liquid crystal panel located adjacent to the one of the sides of the display panel disposed in the thickness direction,
the switch liquid crystal panel including:
a pair of substrates;
a liquid crystal layer enclosed between the pair of substrates;
a common electrode provided on one of the pair of substrates; and
a plurality of drive electrodes provided on the other of the pair of substrates and each of the plurality of drive electrodes working together with the common electrode when a voltage is applied to implement a light-shielding portion,
a first direction is a direction in which the light-shielding portions and the transparent portions are arranged alternatingly,
a second direction is a longitudinal direction of the light-shielding portions,
a boundary portion extends in the second direction and is located between two pixels that are adjacent to each other in the first direction, and
edges of the drive electrodes in the first direction include portions crossing a reference line extending in the second direction and the edges fluctuate in a specified cycle along the second direction,
a fluctuation range of edges of the light-shield portions in the first direction is not wider than a distance between the pixels in the first direction, and
the edges of the light-shielding portions do not reach an adjacent pixel.

7. The stereoscopic display device according to claim 6, wherein: the edges of the drive electrodes disposed in the first direction are not parallel to edges of the boundary portion disposed in the first direction.

* * * * *